United States Patent
Yoshida (10) Patent No.: US 7,651,755 B2
(45) Date of Patent: Jan. 26, 2010

(54) HONEYCOMB STRUCTURE AND SEAL MATERIAL

(75) Inventor: Yutaka Yoshida, Gifu (JP)

(73) Assignee: Ibiden, Co., Ltd., Gifu (JP)

( * ) Notice: Subject to any disclaimer, the term of this patent is extended or adjusted under 35 U.S.C. 154(b) by 0 days.

(21) Appl. No.: 11/389,333

(22) Filed: Mar. 27, 2006

(65) Prior Publication Data

US 2006/0216466 A1  Sep. 28, 2006

(30) Foreign Application Priority Data

Mar. 28, 2005  (WO) ................. PCT/JP2005/006532

(51) Int. Cl.
  *B32B 3/12* (2006.01)
  *C04B 35/00* (2006.01)
  *B01D 39/06* (2006.01)

(52) U.S. Cl. ........................................ 428/116; 55/523

(58) Field of Classification Search ................. 427/116; 428/116, 117, 120, 153, 188; 501/118, 119, 501/120, 153, 154; 55/523, 483, 502

See application file for complete search history.

(56) References Cited

U.S. PATENT DOCUMENTS

| | | | |
|---|---|---|---|
| 4,297,140 A | | 10/1981 | Paisley |
| 4,559,193 A | * | 12/1985 | Ogawa et al. ................ 264/631 |
| 4,595,662 A | | 6/1986 | Mochida et al. |
| 4,749,671 A | * | 6/1988 | Saito et al. ..................... 502/64 |
| 5,914,187 A | * | 6/1999 | Naruse et al. ................ 428/327 |
| 6,669,751 B1 | | 12/2003 | Ohno et al. |
| 7,056,568 B2 | * | 6/2006 | Ichikawa et al. ............. 428/116 |
| 7,112,233 B2 | | 9/2006 | Ohno et al. |
| 7,138,168 B2 | * | 11/2006 | Fujita .......................... 428/116 |
| 7,284,980 B2 | | 10/2007 | Saijo et al. |
| 7,309,370 B2 | | 12/2007 | Kudo et al. |
| 7,332,014 B2 | | 2/2008 | Ono et al. |
| 7,341,614 B2 | | 3/2008 | Hayashi et al. |
| 7,348,049 B2 | | 3/2008 | Yoshida |
| 7,387,829 B2 | | 6/2008 | Ohno et al. |
| 7,393,376 B2 | | 7/2008 | Taoka et al. |
| 7,396,586 B2 | | 7/2008 | Ohno et al. |
| 7,427,308 B2 | | 9/2008 | Taoka et al. |
| 7,438,967 B2 | | 10/2008 | Fujita |
| 7,449,427 B2 | | 11/2008 | Ohno et al. |

(Continued)

FOREIGN PATENT DOCUMENTS

JP  64-42373  2/1989

(Continued)

OTHER PUBLICATIONS

European Search Report dated Jul. 13, 2006.

(Continued)

*Primary Examiner*—Timothy M Speer
*Assistant Examiner*—Gordon R Baldwin
(74) *Attorney, Agent, or Firm*—Finnegan, Henderson, Farabow, Garrett & Dunner LLP (57) ABSTRACT

A honeycomb structure is formed by adhering a plurality of honeycomb units provided with cells to each other through a layer of a seal material layer, in which the layer of the seal material comprises an inorganic binder and oxide particles having a particle size of about 0.01 to about 100 µm.

10 Claims, 6 Drawing Sheets

U.S. PATENT DOCUMENTS

| | | | |
|---|---|---|---|
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 2004/0101654 A1* | 5/2004 | Hijikata ..................... 428/116 |
| 2004/0161596 A1 | 8/2004 | Taoka et al. |
| 2005/0050845 A1 | 3/2005 | Masukawa et al. |
| 2005/0079975 A1 | 4/2005 | Fujita |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |
| 2009/0199953 A1 | 8/2009 | Sato |
| 2009/0202402 A1 | 8/2009 | Sato |
| 2009/0220735 A1 | 9/2009 | Mizuno et al. |

FOREIGN PATENT DOCUMENTS

| | | |
|---|---|---|
| JP | 8-28246 | 1/1996 |
| JP | 2001-96116 | 4/2001 |
| JP | 2002-200409 | 7/2002 |
| JP | 2004-130176 | 4/2004 |
| WO | WO-03/048072 A1 | 6/2003 |

OTHER PUBLICATIONS

"Geometrical Product Specification (GPS)-Surface Texture : Profile Method-Terms, Definitions and Surface Texture Parameters"; Japanese Industrial Standard, Ref No. B 0601, pp. 1-26, (2001).

English translation of Office Application in corresponding Korean patent application No. 2006-7008116.

U.S. Appl. No. 11/760,037.
U.S. Appl. No. 11/927,091.
U.S. Appl. No. 11/874,790.
U.S. Appl. No. 11/851,300.
U.S. Appl. No. 11/925,459.
U.S. Appl. No. 11/932,469.
U.S. Appl. No. 12/400,389.
U.S. Appl. No. 12/342,903.
U.S. Appl. No. 12/393,200.
U.S. Appl. No. 12/411,148.
U.S. Appl. No. 11/711,021.
U.S. Appl. No. 11/951,949.

* cited by examiner

Cross-sectional view taken along the A-A line

HONEYCOMB STRUCTURE AND SEAL MATERIAL

FIELD OF THE INVENTION

This invention relates to a honeycomb structure and a seal material used in the honeycomb structure.

BACKGROUND ART

As the honeycomb structure used in the purification apparatus for the exhaust gas of the internal engine, there are a one-piece honeycomb structure of cordierite, an assembly type honeycomb structure formed by integrally adhering a plurality of silicon carbide honeycomb units through a seal material (adhesive material), and so on. As the seal material is recommended a material constituted with ceramic particles of a carbide or a nitride having a high thermal conductivity such as silicon carbide, aluminum nitride or the like (see, for example, JP-A08-28246 and JP-A2004-130176). As an example of a refractory adhesive showing a plasticity are known an inorganic aggregate, inorganic fibers, an inorganic binder such as colloidal silica and/or colloidal alumina, and a fibrous refractory adiabatic composition compounded with an aqueous mixed solution of polyvinyl alcohol and methyl cellulose as an organic binder (see, for example, JP-A64-42373).

The contents of JP-A08-28246, JP-A2004-130176 and JP-A64-42373 are incorporated herein by reference in their entirety.

DISCLOSURE OF THE INVENTION

When an embodiment of the invention is a honeycomb structure of an assembly type of joining a plurality of honeycomb units, the invention proposes a honeycomb structure characterized by a seal material layer used for adhering the mutual honeycomb units with each other and a seal material layer used for sealing an outer peripheral portion of a honeycomb block formed by adhering the plurality of the honeycomb units as well as the seal material therefor.

That is, an embodiment of the honeycomb structure of the invention is a honeycomb structure formed by adhering a plurality of honeycomb units provided with cells to each other through a layer of a seal material layer, in which the layer of the seal material comprises an inorganic binder and oxide particles having a particle size of about 0.01 to about 100 μm.

In the honeycomb structure according to the invention, it is desirable that another seal material layer is disposed on an outermost peripheral portion of a honeycomb block formed by joining the plurality of the honeycomb units so as to surround the surface, and that the oxide particles in the seal material layer comprise particles of at least one selected from alumina, zirconia, titania and silica, and that the particle size of the oxide particles is about 0.1 to about 75 μm.

Also, the honeycomb structure according to the invention is desirable that the honeycomb unit is an oxide ceramic, that the surface of the honeycomb unit has an oxide layer, that the oxide layer has a thickness of about 1 nm to about 1 μm, that the surface of the honeycomb unit contacting with the seal material layer has a roughness Ra of about 1.0 to about 30 μm, that the honeycomb unit is plugged at either one of both opening ends of the cells with a plugging material, that a catalyst is supported on a wall surface of the cell in the honeycomb unit, and that it is used as an apparatus for the purification of an exhaust gas in an automobile.

Furthermore, an embodiment of the seal material according to the invention is a seal material comprising oxide particles having a particle size of about 0.01 to about 100 μm and an inorganic binder. As the oxide particle comprise desirably used one or more particles selected from alumina, zirconia, titania and silica.

BEST MODE FOR CARRYING OUT THE INVENTION

As to the seal material used in the honeycomb structure, the inventors have made various experiments on a method of efficiently applying the seal material, and a heat resistance, durability and the like after the adhesion with the seal material. From this experimental results, it has been found that when the oxide ceramics are used as the seal material, the productivity is high and the sealing property, adhesion strength and resistance to thermal shock are improved. Furthermore, it has been found that the above properties of the seal material are influenced by the particle size in case of using the oxide ceramics.

That is, the honeycomb structure of the invention is particularly characterized by the seal material. It has been found that when the seal material mainly contains the oxide ceramic and has a particle size of about 0.01 to about 100 μm, preferably about 0.1 to about 75 μm, the properties as the honeycomb structure such as sealing property, and adhesion strength and durability of unit are considerably improved.

Although the reason is not clear, it has been understood by the inventors as follows. That is, the honeycomb unit being one constitutional element in the honeycomb structure of the invention is porous and many opening holes are existent on the surface thereof. Therefore, the inorganic particles as a constitutional component of the seal material become at a state of penetrating into the inside of the honeycomb unit through the opening holes between the mutually adjoining honeycomb units. Since the honeycomb units are adhered at this state, it is considered that they are strongly bonded to each other and the high sealing property is obtained.

As the reason producing such action and effect, the inventors think that the oxide particles have OH group at their surfaces and chemically bonds to the inorganic binder in the seal material. In the seal material, therefore, when the particle size of the oxide particles is extremely large, the contact area with the inorganic binder becomes less and the chemical bonding is weak, while when the particle size of the oxide particles is extremely small, the bonding between the oxide particle and the inorganic binder is obstructed to bring about the lowering of the adhesion strength and hence the lowering of the adhesion strength between the honeycomb units. In other words, it is considered that the oxide particles are large in the bonding action with the inorganic binder as compared with the carbide or the like but the effect is affected by the size of the oxide particles.

In the invention, it is desirable that the oxide particles constituting the seal material are crystalline. Because, when amorphous oxide particles form a main phase of the seal material, the whole of the seal material becomes at an amorphous ceramic state and these particles are only existent in the inorganic binder and hence the strength, corrosion resistance and heat resistance as the seal material lower. In this connection, the strength, corrosion resistance and heat resistance of the seal material can be increased by adding crystalline oxide particles. Moreover, the judgment of crystalline oxide or amorphous oxide is conducted by an X-ray diffraction, a Fourier transform infrared spectrometer (FT-IR) or the like.

In the invention, the honeycomb unit contacting with the seal material layer is preferable to use an oxide ceramic or various ceramics having an oxide layer at the surface. Because, the oxide ceramic has OH group at its surface as previously mentioned and is liable to be chemically bonded to the inorganic binder in the seal material. Even in the case of non-oxide ceramic, if the oxide layer is existent on the surface, the OH group is existent on the surface of the oxide layer, so that the chemical bonding to the inorganic binder is easily caused.

Also, it is preferable in the invention that the surface roughness Ra of the honeycomb unit contacting with the seal material layer (according to JIS-B-0601 (2001)) is adjusted to about 1 to about 30 μm. When the surface roughness is about 1 μm or more, the contact area between the honeycomb unit and the seal material layer becomes large and hence the adhesion strength between the honeycomb units does not lower, while when it is about 30 μm or less, a gap is hardly generated in the concave portion of the irregularity to bring about no lowering of the adhesion strength between the honeycomb units.

Moreover, the surface of the honeycomb unit contacting with the seal material layer means a surface of an outermost peripheral portion (outer wall) of a honeycomb block formed by combining the honeycomb units in addition to the outer peripheral surface of the honeycomb unit itself.

The contents of JIS-B-0601 (2001) are incorporated herein by reference in their entirety.

In the seal material according to the invention is added the inorganic binder. Particularly, the oxide-based inorganic binder, for example, an oxide sol such as alumina sol, silica sol, colloidal silica or the like, and water glass, colloid of oxide and so on can be used.

Also, the oxide particles are included in the seal material. For example, particles of oxide such as alumina, silica, cordierite, mullite, zirconia, aluminum titanate or the like can be used. Thus, the use of the oxide particles as a main component of the seal material is excellent in the heat insulating property because of low thermal conductivity and can maintain the temperature inside the honeycomb unit at a high level and hence the activity of the oxide catalyst for oxidizing and removing particulates can be increased.

Furthermore, the seal material may be added with inorganic fibers or the like in addition to the above inorganic binder and oxide particles. In this case, the inorganic fibers are fixed at their cross points by the inorganic binder and the oxide particles are inserted and dispersed into gaps of three-dimensional network structure produced by entangling these inorganic fibers and such a state is strongly maintained through the presence of the inorganic binder.

As the inorganic fibers can be used whiskers or the like of oxide, nitride, carbide or the like. For example, alumina fibers, silica fibers, silica-alumina fibers and the like can be used as the oxide-based inorganic fiber, and silicon nitride fibers, titanium nitride fibers and the like can be used as the nitride-based inorganic fiber, and silicon carbide fibers and the like can be used as the carbide-based inorganic fiber.

The seal material having the above construction dhows an elasticity and has a high adhesion strength. Particularly, when the oxide particles, oxide inorganic binder and oxide fibers are used as the component of the seal material, there is a merit that cracks resulted from the difference of thermal expansion coefficient hardly occurs.

Moreover, JP-A64-42373 discloses a heat-resistant composition for thermal equipment comprising inorganic fibers, oxide particles, inorganic binder and organic binder, but recommends the use of oxide particles having a larger particle size for improving the plasticity, which is different from the particle size defined in the invention.

The honeycomb structure of the invention will be described with reference to the drawings below.

Figure 1:
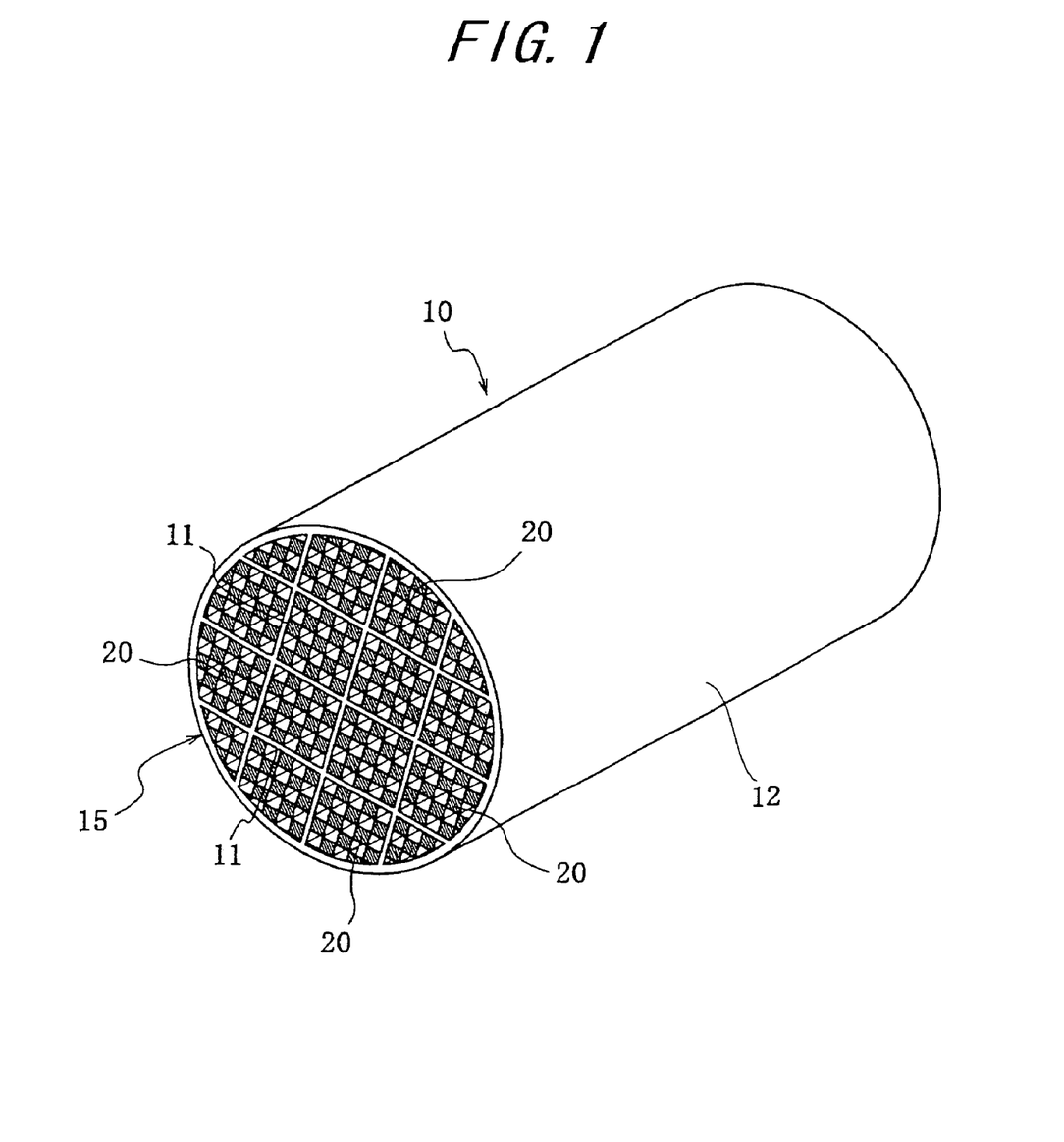
FIG. 1 is a schematic view of a honeycomb structure (honeycomb block) 10 according to the invention.
Figure 2:
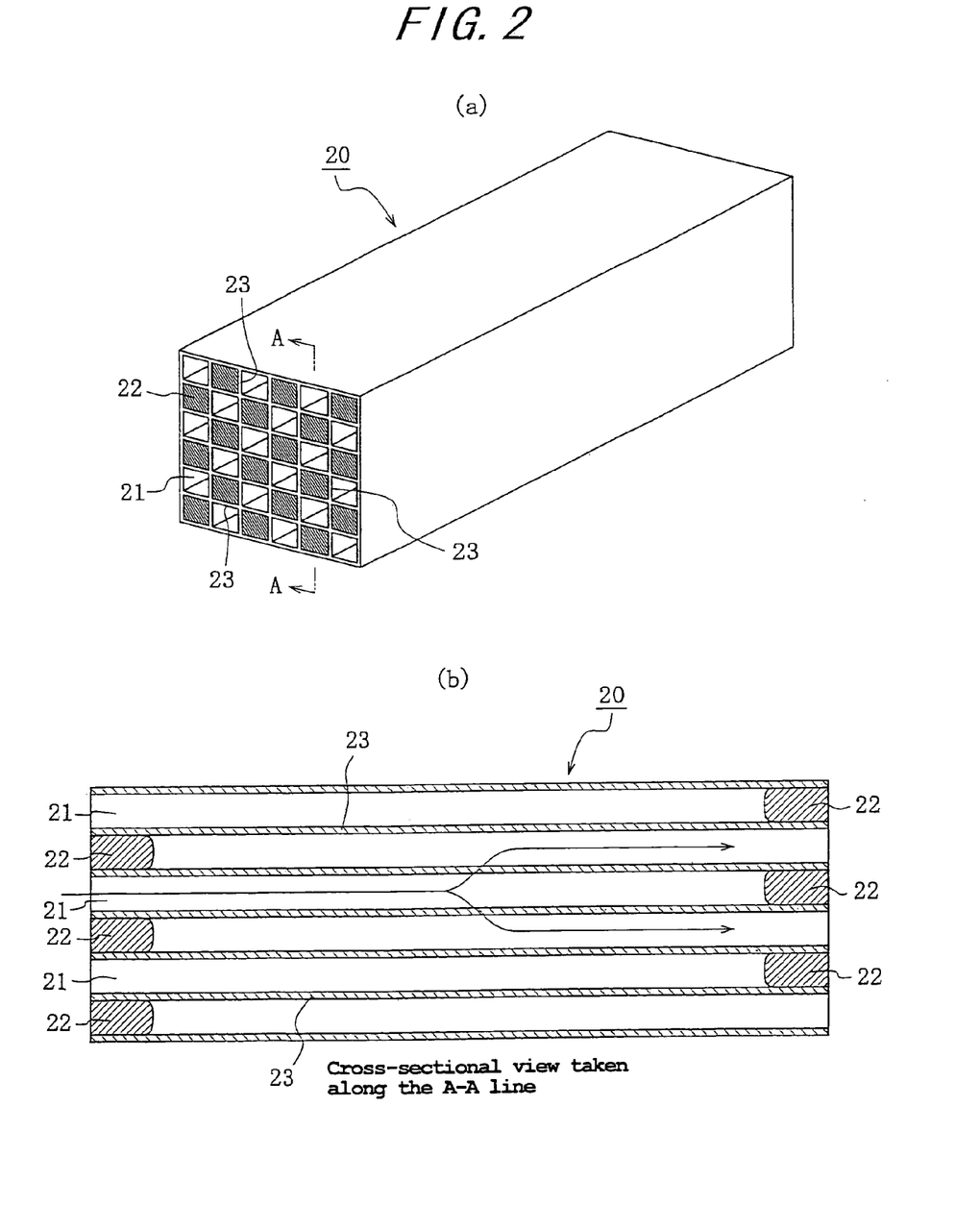
FIG. 2 is a schematic view of a honeycomb unit 20 according to the invention.

FIG. 1 is a perspective view schematically showing an embodiment of the honeycomb structure, and FIG. 2(*a*) is a perspective view schematically showing an embodiment of the honeycomb unit constituting the honeycomb structure 10 shown in FIG. 1 and FIG. 2(*b*) is a section view thereof. This honeycomb unit 20 has a plurality of cells (through-holes) 21 extending from a near side toward a far side, and these cells 21 have a honeycomb structure of arranging side by side through cell walls 23. Also, end opening portions may be sealed to form a checkered pattern by plugging material 22 for the purpose of purifying the particulates, if necessary.

The honeycomb structure 10 is a honeycomb block 15 formed by combining a plurality of honeycomb units 20 in parallel through seal material layers (adhesive layers) 11 and binding them. Further, it is desirable that a seal material layer (coating layer) 12 is disposed on an outermost periphery of the honeycomb block 15 for causing no leakage of the exhaust gas from a gap to a casing and reinforcing the honeycomb block. The combination of the honeycomb units is called as an assembly type honeycomb structure. The assembly type honeycomb structure can enhance the resistance to thermal shock as a whole and the strength to vibrations using the above seal material layers 11, 12 even if the mechanical strength, resistance to thermal shock and the like of the individual honeycomb units are low.

The reason why the strength to thermal shock and vibrations in the honeycomb structure having the above construction becomes high is considered due to the fact that even if the temperature distribution is produced in the honeycomb structure by the rapid temperature change or the like, the temperature difference among these honeycomb units is small and the thermal shock and vibrations are absorbed by the seal material layers. Further, even if cracks are produced in the honeycomb units 20 through thermal stress or the like, the seal material layer has an action of preventing the propagation of the cracks into the whole of the honeycomb structure. Moreover, the seal material layer plays a role as a protection layer for the honeycomb structure and serves to maintain the shape of the honeycomb structure over a long time of period to improve the durability.

The honeycomb unit is preferable to render into an easily joining shape. For example, a section perpendicular to a longitudinal direction of the cell (hereinafter referred to as "unit section") is desirable to be square, rectangular or hexagonal and may be a fan-like form.

Also, the honeycomb unit is preferable to have a unit sectional area of about 5 to about 50 $cm^2$. When the unit sectional area is about 5 $cm^2$ or more, the pressure loss hardly increases. While, when the unit sectional area is about 50 $cm^2$ or less, the thermal stress produced in the honeycomb structure can be easily dispersed and cracks are hardly generated at a time of applying the thermal stress. In order to make the above action and effect more remarkable, the unit sectional area is preferable to be about 6 to about 40 $cm^2$, more preferably about 8 to about 30 $cm^2$.

The honeycomb block formed by combining the plurality of the honeycomb units having the above construction, i.e. the honeycomb structure is preferable to be rendered into a shape such as cylindrical, rectangular pillar, cylindroid or the like.

As a main material (skeleton component) of the honeycomb unit can be used inorganic particles, fibers or whisker of a nitride ceramic such as aluminum nitride, silicon nitride, boron nitride, titanium nitride or the like; a carbide ceramic such as silicon carbide, zirconium carbide, titanium carbide, tantalum carbide, tungsten carbide or the like; or an oxide ceramic such as alumina, zirconia, cordierite, mullite, aluminum titanate or the like. Among them, it is preferable to use the silicon carbide ceramic having excellent heat resistance and mechanical properties and a large thermal conductivity. Particularly, the silicon-containing ceramic compounded with metallic silicon, ceramics joined with silicon or silicate compound and the like are preferable. Moreover, the silicon carbide ceramic is not only constituted with only silicon carbide, but also includes one composed mainly of silicon carbide and joined with a metal or a crystalline or amorphous compound.

In the invention, the honeycomb unit comprising essentially of the above non-oxide ceramic is desirable to have an oxide layer (possibly about 1 nm-about 1 μm) at its surface in addition to the case that at least surface is the oxide ceramic. The reason why the oxide layer is formed on the surface is due to the fact that the oxide layer is chemically bonded to the inorganic binder through OH group in the layer and at the same time the oxide particles in the seal material layer is chemically bonded to the inorganic binder as mentioned above and hence the honeycomb units are strongly adhered through the seal material layer.

Moreover, when the oxide layer has a thickness of about 1 nm to about 1 μm, the oxide in the oxide layer is well and chemically bonded to the inorganic binder. However, it is guessed that when the thickness of this layer is about 1 nm or more, the chemical bond becomes not weak, while when it is about 1 μm or less, the difference of the thermal conductivity becomes not large and cracks are hardly produced.

The material constituting the honeycomb unit may be "multi-mixed type honeycomb unit" comprising the above skeleton material (main material) and a sub-component (material).

In the multi-mixed type honeycomb unit, it is preferable that the main material includes at least inorganic ceramic and inorganic binder and the sub-component includes at least inorganic material (reinforcing material). In such a honeycomb unit, the inorganic ceramic particles can be bonded through the inorganic binder to provide a strength stably maintaining the honeycomb form.

In case that the inorganic material as the main material and the inorganic material as the sub-component are different from each other, there can be selected from a case using different components, a case that the shapes (e.g. particle size, aspect ration or the like) are different even if the same component is used or the properties (e.g. different crystal forms, different melting points or the like). Such a multi-mixed type honeycomb unit is effective to enhance the strength of the honeycomb structure.

As the inorganic material of the sub-component can be used one or more ceramic particles selected from silicon carbide, silicon nitride, alumina, silica, zirconia, titania, ceria and mullite. Also, when the inorganic fibers are used as the sub-component, there can be used one or more inorganic fibers selected from alumina fibers, silica fibers, silicon carbide fibers, silica-alumina fibers, glass fibers, potassium titanate fibers and aluminum sulfate fibers. Further, in case of the whisker, there can be used one or more whiskers selected from alumina, silica, zirconia, titania, ceria and mullite.

The reason why the inorganic binder is used in the production of the multi-mixed type honeycomb unit is due to the fact that it is effective to provide the sufficient strength even if the firing temperature of the honeycomb unit is made low. As the inorganic binder can be used inorganic sol, clay binder and the like. Among them, as the inorganic sol can be used one or more inorganic sols selected from alumina sol, silica sol, titania sol, water glass and the like. As the clay binder can be used one or more selected from white clay, kaolin, montmorillonite, composite chain structure type clay (zeolite, attapulgite) and the like.

The honeycomb structure of the invention can be used as a filter for the purification of the exhaust gas in order to remove particulates included in the exhaust gas. In this case, the honeycomb unit is a porous member having preferably a porosity of about 20 to about 80%, more preferably a porosity of about 50 to about 70%. When the porosity of the honeycomb unit is about 20% or more, the pressure loss of the filter becomes not higher. While, when the porosity is about 80% or less, the strength of the honeycomb structure does not lower and the breakage hardly occurs. Moreover, if the catalyst is provided onto the cell wall of the honeycomb unit, the pressure loss may be easily increased, so that the porosity is desirable to be about 50 to about 70%. The porosity can be measured, for example, by a conventionally known method such as a mercury pressure method, an Archimedes method and scanning type electron microscope (SEM).

When the honeycomb structure is used as a filter for the purification of the exhaust gas for catching particulates included in the exhaust gas to purify the exhaust gas, it is preferable to use a ceramic member having an average pore size of about 5 to about 100 μm as a honeycomb unit. When the average pore size is about 5 μm or more, the pressure loss of the filter to the exhaust gas becomes not higher, while when the average pore size is about 100 μm or less, the particulates hardly pass through the pores and the catching efficiency hardly lowers.

The seal material layer may be a mixture of oxide particles and inorganic binder, a mixture of oxide particles, inorganic fibers and inorganic binder, a mixture of oxide particles, inorganic particles and inorganic binder, a mixture of oxide particles, inorganic fibers, inorganic particles and inorganic binder or a mixture of the above mixture added with an organic binder.

As the oxide particle may be mentioned oxide ceramic powder, fibers, whisker or the like of alumina, silica, titania, zirconia, cordierite, mullite, aluminum titanate or the like. They may be used alone or in a combination of two or more.

As the inorganic binder may be mentioned silica sol, alumina sol, water glass and the like. They may be used alone or in a combination of two or more. Among the above inorganic binders, the use of silica sol is desirable.

As the inorganic fiber may be mentioned ceramic fibers of silica-alumina, mullite, alumina, silica or the like. They may be used alone or in a combination of two or more. Among the above inorganic fibers, silica-alumina fibers are desirable.

As the inorganic particle may be mentioned carbide ceramic, nitride ceramic and the like. Particularly, inorganic powder or whisker of silicon carbide, silicon nitride, boron nitride or the like may be mentioned. They may be used alone or in a combination of two or more. Among the above inorganic particles, the use of silicon carbide having an excellent thermal conductivity is desirable.

As the organic binder are mentioned one or more organic binders selected from polyvinyl alcohol, methyl cellulose, ethyl cellulose, carboxymethyl cellulose and the like.

Figure 3:
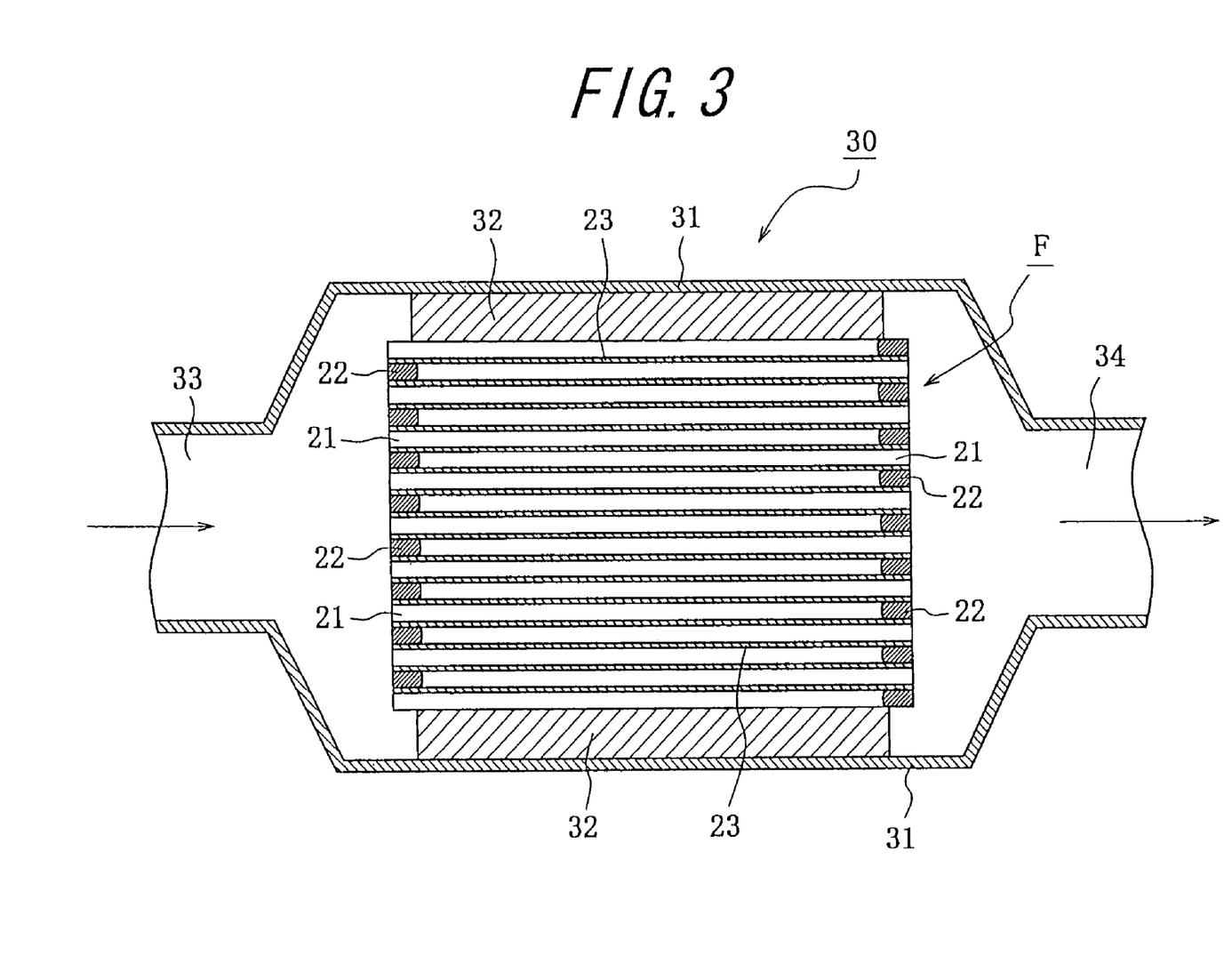
FIG. 3 is a view illustrating a state of mounting a filter for the purification of an exhaust gas constituted with the honeycomb structure according to the invention onto an apparatus for the purification of the exhaust gas in an automobile.

The honeycomb structure having the above construction according to the invention can be used in the filter for the purification of the exhaust gas. FIG. 3 shows an example of mounting the filter for the purification of the exhaust gas made from the honeycomb structure according to the invention onto an exhaust gas purifying apparatus for an automobile. As shown in this figure, the apparatus 30 for the purification of the exhaust gas comprises a filter F for the purification of the exhaust gas made of the honeycomb structure of the invention, a casing 31 covering the outside of the filter F for the purification of the exhaust gas, an air-tightness support member 32 interposed between the filter F for the purification of the exhaust gas and the casing 31, and, if necessary, a heating means (not shown) arranged at a side of introducing the exhaust gas, in which an end portion of the casing 31 at the inlet side of the exhaust gas is connected to an inlet pipe 33 connected to an internal combustion such as an engine or the like and the other end portion of the casing 31 is connected to an outlet pipe 34 connected to the outside.

The exhaust gas discharged from the internal combustion such as engine or the like is introduced through the inlet pipe 33 into the apparatus 30 for the purification of the exhaust gas and then flowed through the cells opened to the inlet side (the outlet side is sealed with the plugging material 22 into the filter F for the purification of the exhaust gas and passed through the cell walls to catch particulates on the cell walls 23, and the purified gas is discharged from the cells opened to the outlet side toward the outside of the apparatus F for the purification of the exhaust gas and further through the outlet pipe 34 to the outside. Moreover, if it is intended to convert gas components of non-particular form, the plugging material 22 is not required.

As a greater amount of particulates are deposited on the cell walls 23 of the filter F for the purification of the exhaust gas in the exhaust gas purifying apparatus 30 to increase the pressure loss, the filter F for the purification of the exhaust gas is subjected to a reproduction treatment. In this reproduction treatment, a gas heated by using a heating means such as exhaust gas, catalyst disposed if necessary, heater or the like is introduced into the insides of the cells 21 in the filter F for the purification of the exhaust gas to heat the filter F for the purification of the exhaust gas, whereby the particulates deposited on the cell walls 23 are burnt and removed.

Recently, the environment surrounding the above honeycomb structure for the purification of the exhaust gas is largely changed, so that the seal material as a constitutional element of the structure is required to have higher sealing property and adhesion strength, but the honeycomb structure itself is demanded to more improve the durability over a long period of time.

As mentioned above, the honeycomb structure and seal material according to the invention can expect effects that when the layer of the seal material having the construction inherent to the invention is arranged in the space between the mutual honeycomb units or disposed on the outer peripheral portion of the honeycomb block formed by binding the plurality of the honeycomb units, since the particle size of the oxide particles in the seal material layer is about 0.01 to about 100 μm, cracks and the like through thermal shock hardly occurs and the high sealing property and adhesiveness are developed, and also when it is used under an environment easily subjected to thermal shock as in a filter for the purification of the exhaust gas or the like, the durability can be kept over a long time of period and further it is well durable to the reproduction treatment by heating to improve the service life.

Next, an example of the production method of the honeycomb structure 10 according to the invention will be described.

At first, a green shaped body of a honeycomb unit is produced by preparing a starting paste composed mainly of the above starting materials (one kind of material in case of the usual honeycomb unit, or inorganic material as a main material and inorganic material as a sub-material and inorganic binder or the like in case of the multi-mixed type honeycomb units) and subjecting the paste to an extrusion shaping or the like. The starting paste may be properly added with an organic binder, a dispersion medium and a shaping assist in addition to the above materials. As the organic binder can be used one or more organic binders selected from methylcellulose, carboxymethyl cellulose, hydroxyethyl cellulose, polyethylene glycol, phenolic resin and epoxy resin. The amount of the organic binder compounded is preferable to be about 1 to about 10% by weight based on 100 parts by weight of a total of the inorganic material of the first form, the inorganic material of the second form and the inorganic binder. As the dispersion medium can be used water, an organic solvent (benzene and the like) and an alcohol (methanol and the like). As the shaping assistant can be used ethylene glycol, dextrin, aliphatic acid, fatty acid, fatty acid soap and polyalcohol.

The starting paste is preferable to be well mixed and milled, so that it may be sufficiently milled by using a mixer, an attritor, a kneader or the like. In the shaping of the starting paste, it is preferable that the cells, and the cell walls are formed, for example, by extrusion shaping or the like.

Then, the green shaped body is dried by using a drying machine such as a microwave drier, a hot air drier, a dielectric drier, a drier under a reduced pressure, a vacuum drier, a freezing drier or the like. If necessary, the drying is conducted after either one of end portions of the cells is sealed with a seal material.

Next, the green shaped body is degreased. The degreasing conditions are properly adjusted in accordance with the kind and amount of the organic binder included in the green shaped body, but it is preferable to conduct the degreasing at about 400° C. for about 2 hours. Further, the dried and degreased shaped body is fired. The firing is preferable to be carried out at a temperature of about 600 to about 2200° C. Particularly, it is preferably to be about 600 to about 1200° C. in case of the oxide ceramic, and it is preferable an inert atmosphere of about 1000 to about 2200° C. in case of the nitride and carbide ceramics. Through these steps can be obtained a honeycomb unit made from a porous ceramic member of a honeycomb structure having plural cells.

Thereafter, the honeycomb unit is fired, if necessary, and subjected to a heat treatment in an oxidizing atmosphere above about 700° C., whereby an oxide film is formed on the surface of the honeycomb unit, or the coating of an oxide ceramic is carried out to form an oxide layer.

If necessary, it is possible to adjust a surface roughness by subjecting the surface of the honeycomb unit to a working with sand blast or the like.

Then, a seal material paste made of the above starting material is applied onto the outer peripheral surface of the thus obtained honeycomb unit to pre-join a plurality of honeycomb units (16 units in FIG. 1). Moreover, the seal material paste in the following examples is used by adding the aforementioned inorganic binder with the aforementioned inorganic particles, inorganic fiber and organic binder.

Next, the pre-joined honeycomb units are dried and fixed to obtain a honeycomb block (honeycomb structure) as a joined body of the honeycomb units having a given size. In this case, the drying temperature somewhat changes in accordance with the kind and amount of the organic substance, but is usually a range of about 100 to about 200° C.

Moreover, the seal material layer 11 interposed between the mutual honeycomb units may be a dense body or may be a porous body capable of flowing the exhaust gas. However, the seal material layer 12 as a coating material layer for the outermost layer is desirable to be at least made of a dense body. The seal material layer 12 is used for the purpose of preventing the leakage of the exhaust gas from the outer periphery of the honeycomb block when the assembly type honeycomb structure of the invention is disposed in the exhaust path of the internal combustion.

The seal material layer 11 used for joining the honeycomb units to each other is preferable to have a thickness of about 0.5 to about 3 mm. When the thickness of the seal material layer 11 is about 0.5 mm or more, the sufficient adhesion strength is easily obtained, while when the thickness of the seal material layer is about 3 mm or less, the pressure loss may be hardly increased.

The number of the honeycomb units joined may be properly decided in accordance with the size of the honeycomb structure. Also, the honeycomb block (joint body) formed by adhering the porous honeycomb units with the seal material layer is properly subjected to a finish treatment such as cutting, polishing or the like.

Moreover, when the form of the honeycomb block is made to a form of the predetermined honeycomb structure (e.g. cylindrical shape) formed by shaping porous honeycomb units of fan-shaped or square section, it is possible to omit the cutting or polishing step of the honeycomb block.

For the purpose of coating the outer peripheral surface of the honeycomb structure, i.e. the side face not opening the through-holes (cell holes), the seal material is applied and fixed by drying to form the seal material layer 12. The coating material layer 12 is preferably existent for protecting the outer peripheral surface of the honeycomb unit to enhance the strength. In this case, the seal material is not particularly limited, but may be the same as the seal material used between the honeycomb units or a different material. The coating material may have the same compounding ratio as in the aforementioned seal material or a different compounding ratio. The coating material layer is preferable to have a thickness of about 0.1 to about 3 mm. When the thickness is 0.1 mm or more, the outer peripheral surface is sufficiently protected and the leakage of the gas hardly occurs and the strength can be easily enhanced. While, when it is about 3 mm or less, if thermal stress or the like is applied to the honeycomb structure, cracks hardly occur or the pressure loss hardly increases. The drying and fixation of the coating layer may be carried out under substantially the same conditions as in the aforementioned seal material layer.

Further, the plurality of the honeycomb units are joined through the seal material and then calcined. But, when a coating material layer is applied to the outer peripheral surface thereof, a calcination is carried out after applying the coating material layer. If the organic binder is included in the seal material and the coating material, the degreasing can be conducted by the calcination. The calcination conditions are properly determined in accordance with the kind and amount of the organic substance included, but it is preferable to conduct the calcination at about 400 to about 800° C. for about 1 to about 2 hours. In case of using the thus calcined honeycomb structure, there is caused no discharge of the contaminated gas due to the burning of the organic binder remained in the honeycomb structure.

The application of the thus obtained honeycomb structure according to the invention is not particularly limited, but it can be used as a catalyst carrier for the conversion of the exhaust gas in the automobiles or a diesel-particulate-filter having a function of filtering particulate substance in the exhaust gas to purifying by burning.

Also, a honeycomb catalyst may be formed by supporting a catalyst component on the thus obtained honeycomb structure. The catalyst component is not particularly limited, but may be a noble metal, an alkali metal compound, an alkaline metal compound, an oxide or the like. As the noble metal are mentioned one or more selected from platinum, palladium and rhodium. As the alkali metal compound are mentioned compounds of one or more selected from potassium, sodium and the like. As the alkaline metal compound are mentioned of compounds of barium and the like. As the oxide are mentioned perovskite ($La_{0.75}K_{0.25}MnO_3$ and the like), $CeO_2$ and the like. The resulting honeycomb catalyst is not particularly limited, but can be used as a so-called three-way catalyst for the purification and/or convertion of the exhaust gas in the automobile or NOx absorption catalyst.

EXAMPLES

The following examples are given in illustration of the invention and are not intended as limitations thereof.

(Test 1)

This test is carried out for confirming the action and effect of each of plural seal material layers (adhesive material, coating material) prepared by variously changing materials such as oxide and the like and formed on an outer surface of a honeycomb unit made from silicon carbides having various surface roughnesses or a fiber-reinforced alumina.

(Preparation of a Paste for Seal Material)

Compounding recipes of pastes 1-27 are shown in Table 1.

As an example of a paste for the seal material, a heat-resistant paste for the seal material is first formed by mixing 30% by mass of inorganic powder (α-alumina particles, average particle size: 0.01 μm), 10% by mass of inorganic fibers (silica-alumina fiber, average fiber diameter: 10 μm, average fiber length: 200 μm), 30% by mass of silica sol (solid content: 30% by mass), 5% by mass of carboxymethyl cellulose and 25% by mass of water. This is a paste 1. Moreover, α-alumina is confirmed to be crystalline because a peak is observed by an X-ray diffractometry. This crystalline alumina is used in all of the following materials.

Similarly, 27 kinds of the pastes are prepared by changing the compounding ratio of the starting powder, inorganic fiber, silica sol and carboxymethyl cellulose as shown in Table 1.

Then, 10 g of each of the pastes is sandwiched between two plates at a thickness of 2 mm and dried at 110° C. for 1 hour. As a result, the pastes 25, 26, 27 show the lowering of the plasticity and generate gaps in places between the plates as shown in Table 1. Therefore, the pastes 25, 26 and 27 are not used in the following examples.

Next, the honeycomb unit is subjected to a heat treatment in air of about 1000° C. under conditions shown in Table 5 (heating time), if necessary to produce an oxide film on the surface of the unit.

Moreover, the thickness of the oxide film is an analytical value in a depth direction through AES. An analytical apparatus is JAMP-7800F (made by Nippon Denshi Co., Ltd.), and the measuring conditions are an applied voltage of 15 kV, an irradiation current of 5×10^(−8) A, and a beam diameter of about 100 nmφ, and the etching conditions are an ion kind of Ar^(+) and an etching grade of 2.8 nm/min as $SiO_2$ conversion. The analytical value is an average value at three places after the etching.

TABLE 1

| | Inorganic powder: αalumina (mass %) | Inorganic powder: Zirconia (mass %) | Inorganic powder: SiC(mass %) | Average particle size of inorganic powder (μm) | Silica-alumina fiber(mass %) fiber length 200 μm fiber diameter 10 μm | silica sol (mass %) solid content 30 mass % | Carboxymethyl cellulose (mass %) | Water (mass %) | Gaps |
|---|---|---|---|---|---|---|---|---|---|
| Paste 1  | 30 | 0  | 0  | 0.01  | 10 | 30 | 5 | 25 | none |
| Paste 2  | 30 | 0  | 0  | 0.1   | 10 | 30 | 5 | 25 | none |
| Paste 3  | 30 | 0  | 0  | 0.5   | 10 | 30 | 5 | 25 | none |
| Paste 4  | 30 | 0  | 0  | 10    | 10 | 30 | 5 | 25 | none |
| Paste 5  | 30 | 0  | 0  | 75    | 10 | 30 | 5 | 25 | none |
| Paste 6  | 30 | 0  | 0  | 100   | 10 | 30 | 5 | 25 | none |
| Paste 7  | 30 | 0  | 0  | 200   | 10 | 30 | 5 | 25 | none |
| Paste 8  | 30 | 0  | 0  | 0.005 | 10 | 30 | 5 | 25 | none |
| Paste 9  | 0  | 30 | 0  | 0.01  | 10 | 30 | 5 | 25 | none |
| Paste 10 | 0  | 30 | 0  | 0.1   | 10 | 30 | 5 | 25 | none |
| Paste 11 | 0  | 30 | 0  | 0.5   | 10 | 30 | 5 | 25 | none |
| Paste 12 | 0  | 30 | 0  | 10    | 10 | 30 | 5 | 25 | none |
| Paste 13 | 0  | 30 | 0  | 75    | 10 | 30 | 5 | 25 | none |
| Paste 14 | 0  | 30 | 0  | 100   | 10 | 30 | 5 | 25 | none |
| Paste 15 | 0  | 30 | 0  | 200   | 10 | 30 | 5 | 25 | none |
| Paste 16 | 0  | 30 | 0  | 0.005 | 10 | 30 | 5 | 25 | none |
| Paste 17 | 0  | 0  | 30 | 0.01  | 10 | 30 | 5 | 25 | none |
| Paste 18 | 0  | 0  | 30 | 0.1   | 10 | 30 | 5 | 25 | none |
| Paste 19 | 0  | 0  | 30 | 0.5   | 10 | 30 | 5 | 25 | none |
| Paste 20 | 0  | 0  | 30 | 10    | 10 | 30 | 5 | 25 | none |
| Paste 21 | 0  | 0  | 30 | 75    | 10 | 30 | 5 | 25 | none |
| Paste 22 | 0  | 0  | 30 | 100   | 10 | 30 | 5 | 25 | none |
| Paste 23 | 0  | 0  | 30 | 200   | 10 | 30 | 5 | 25 | none |
| Paste 24 | 0  | 0  | 30 | 0.005 | 10 | 30 | 5 | 25 | none |
| Paste 25 | 30 | 0  | 0  | 300   | 10 | 30 | 5 | 25 | presence |
| Paste 26 | 0  | 30 | 0  | 300   | 10 | 30 | 5 | 25 | presence |
| Paste 27 | 0  | 0  | 30 | 300   | 10 | 30 | 5 | 25 | presence |

(Preparation of Honeycomb Structure)

The honeycomb unit is prepared by the following two methods.

(Preparation of Silicon Carbide Honeycomb Unit)

A starting material is prepared by mixing 80% by mass of silicon carbide powder having an average particle size of 8.5 μm and 20% by mass of silicon carbide powder having an average particle size of 0.2 μm.

Then, 10 parts by mass of methyl cellulose is added and mixed with respect to 100 parts by mass of the starting powder. Also, 18 parts by mass of a dispersion medium comprising of an organic solvent and water is added to knead all of the materials. Finally, it is extrusion-shaped in a mold into a target honeycomb form to obtain a honeycomb shaped body having many through-holes (cell holes) and then either one end portions of these through-holes are sealed in a checkered form to produce a honeycomb shaped body. The honeycomb shaped body is dried at 150° C., degreased at 500° C. and fired at 2200° C. in an inert gas atmosphere to obtain a honeycomb unit of 34.3 mm×34.3 mm×150 mm.

(Preparation of Fiber-Reinforced Alumina Honeycomb Unit)

At first, 40% by weight of γ-alumina particles (average particle size: 2 μm), 10% by weight of silica-alumina fibers (average fiber diameter: 10 μm, average fiber length: 100 μm, aspect ratio: 10) and 50% by weight of silica sol (solid content: 30% by weight) are mixed and 6 parts by weight of methyl cellulose as an organic binder and small amounts of a plasticizer and a lubricant are added on 100 parts by weight of the resulting mixture, which are further mixed and kneaded to obtain a mixed composition. Then, the mixed composition is shaped through an extrusion machine to obtain a green shaped body.

The green shaped body is sufficiently dried by using a microwave drier and a hot drier and degreased at 400° C. for 2 hours. Thereafter, it is fired at 800° C. for 2 hours to obtain a sample of a porous alumina ceramic honeycomb unit having a square pillar shaped (34.3 mm×34.3 mm×150 mm), a cell density of 93 cells/cm² (600 cpsi) and a rectangular cell form (square).

(Preparation of Honeycomb Structure)

Samples of honeycomb units having various surface roughness of Ra-0.1 μm, 1.0 μm, 10 μm, 15 μm, 20 μm, 30 μm and 40 μm are obtained by subjecting an outer surface of each of the honeycomb units to a working treatment with sand blast having different abrasion grain percentage.

In this case, a value of surface roughness Ra on an outer wall of each sample is measured by means of a surface roughness measuring machine (made by Tokyo Seimitsu Co., Ltd. SURFCOM 920A) by scanning a central portion of the outer surface (four sides) of each sample (honeycomb unit) so as to be parallel to the cell, whereby numerical values at 4 outer surfaces of the honeycomb unit are matched with each other. After the adjustment of the surface roughness, the formation of the above oxide film is conducted to provide example samples.

Then, there are provided 16 units of each of the samples. The units having the same level are adhered to each other with the above paste for the seal material (Table 1, Nos. 1-24) by drying at 150° C. for 2 hours and firing at 500° C., and thereafter the outer peripheral portion thereof cut by a diamond cutter to obtain a columnar ceramic block (assembly type honeycomb structure).

In this case, the seal material layer is 2 mm. Further, the same paste for the seal material is applied onto the outer peripheral portion of the ceramic block to form a seal material layer (coating material layer) of 2 mm, whereby there is produced a honeycomb filter for the purification of the exhaust gas (diameter: 144 mm, length: 150 mm).

Moreover, the silicon carbide honeycomb units are joined with the alumina-based seal material (pastes 1-6, and as a comparative example, pastes 7, 8, 17-24), and the fiber-reinforced alumina honeycomb units are joined with a zirconia-based seal material (pastes 9-14, and as a comparative example, pastes 15-24).

(Evaluation Test)

(1) Thermal Shock Test (Outer Peripheral Portion of Seal Material Layer)

The honeycomb structure is placed in an electric furnace and subjected to a thermal shock test by heating at a temperature rising rate of 5° C./min and keeping at a temperature of 700° C. for 30 minutes and slowly cooling to room temperature (20° C.). The results of the thermal shock test are shown in Tables 2 and 3.

As a result, the pastes 1 - 6 and 9 -14 using the seal material in which the average particle size of alumina or zirconia in the seal material is 0.01 μm-100 μm adaptable to the invention do not show the occurrence of cracks even when the surface roughness Ra of the honeycomb unit is 0.1-40 μm, while when the particle size is 0.005 μm or 200 μm, cracks are generated in the honeycomb structure.

TABLE 2

<Cracked in outer>

| Honyecomb unit Surface roughness Ra(μm) | Seal material: average particle size of alumina particle (μm) | | | | | | | |
|---|---|---|---|---|---|---|---|---|
| | Paste 8 0.005 | Paste 1 0.01 | Paste 2 0.1 | Paste 3 0.5 | Paste 4 10 | Paste 5 75 | Paste 6 100 | Paste 7 200 |
| 0.1 | cracked presence | cracked none | cracked none | cracked none | cracked none | cracked none | cracked none | cracked presence |
| 1 | cracked presence | cracked none | cracked none | cracked none | cracked none | cracked none | cracked none | cracked presence |
| 10 | cracked presence | cracked none | cracked none | cracked none | cracked none | cracked none | cracked none | cracked presence |
| 15 | cracked presence | cracked none | cracked none | cracked none | cracked none | cracked none | cracked none | cracked presence |
| 20 | cracked presence | cracked none | cracked none | cracked none | cracked none | cracked none | cracked none | cracked presence |
| 30 | cracked presence | cracked none | cracked none | cracked none | cracked none | cracked none | cracked none | cracked presence |
| 40 | cracked presence | cracked none | cracked none | cracked none | cracked none | cracked none | cracked none | cracked presence |

TABLE 3

<Cracked in outer>

| Honeycomb unit Surface roughness Ra(μm) | Seal material: average particle size of zirconia particle (μm) | | | | | | | |
|---|---|---|---|---|---|---|---|---|
| | Paste 16 0.005 | Paste 9 0.01 | Paste 10 0.1 | Paste 11 0.5 | Paste 12 10 | Paste 13 75 | Paste 14 100 | Paste 15 200 |
| 0.1 | cracked presence | cracked none | cracked none | cracked none | cracked none | cracked none | cracked none | cracked presence |
| 1 | cracked presence | cracked none | cracked none | cracked none | cracked none | cracked none | cracked none | cracked presence |
| 10 | cracked presence | cracked none | cracked none | cracked none | cracked none | cracked none | cracked none | cracked presence |

TABLE 3-continued

<Cracked in outer>

| Honeycomb unit Surface roughness Ra(μm) | Seal material: average particle size of zirconia particle (μm) | | | | | | | |
|---|---|---|---|---|---|---|---|---|
| | Paste 16 0.005 | Paste 9 0.01 | Paste 10 0.1 | Paste 11 0.5 | Paste 12 10 | Paste 13 75 | Paste 14 100 | Paste 15 200 |
| 15 | cracked presence | cracked none | cracked none | cracked none | cracked none | cracked none | cracked none | cracked presence |
| 20 | cracked presence | cracked none | cracked none | cracked none | cracked none | cracked none | cracked none | cracked presence |
| 30 | cracked presence | cracked none | cracked none | cracked none | cracked none | cracked none | cracked none | cracked presence |
| 40 | cracked presence | cracked none | cracked none | cracked none | cracked none | cracked none | cracked none | cracked presence |

(2) Adhesion Test of Honeycomb Structure

After the honeycomb structure is disposed on a hollow cylindrical jig, one honeycomb filter is selected from the honeycomb structure at substantially a central zone thereof and then a pressure in a pushing direction is applied to this honeycomb filter through a stainless cylindrical jig having a diameter of 31 mm to measure a load till the breakage (adhesion strength), which is a pushing load in the joint portion of the seal material layer (breakage load). The results are shown in Tables 4-6.

Figure 4:
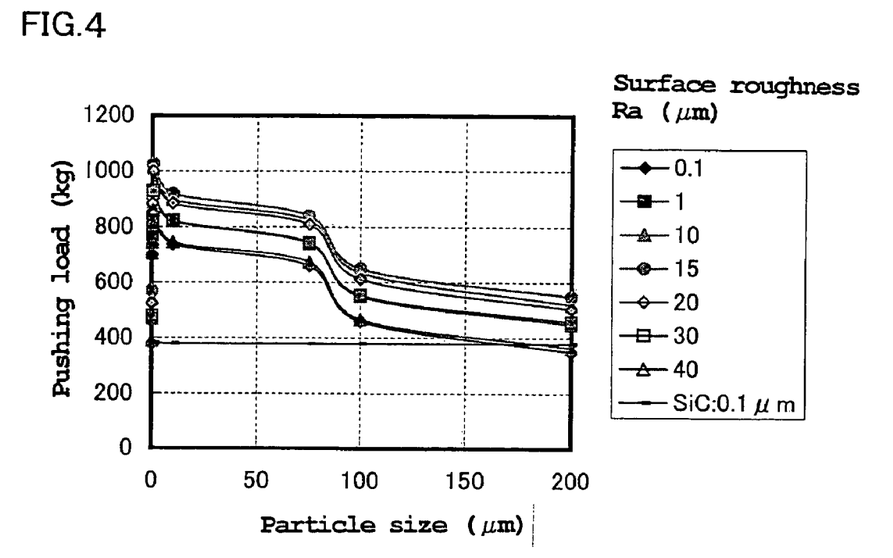
FIG. 4 is a graph showing a relation between an alumina particle size of a seal material and a pushing load when a surface roughness (Ra) of a honeycomb unit is changed in a silicon carbide honeycomb structure.
Figure 5:
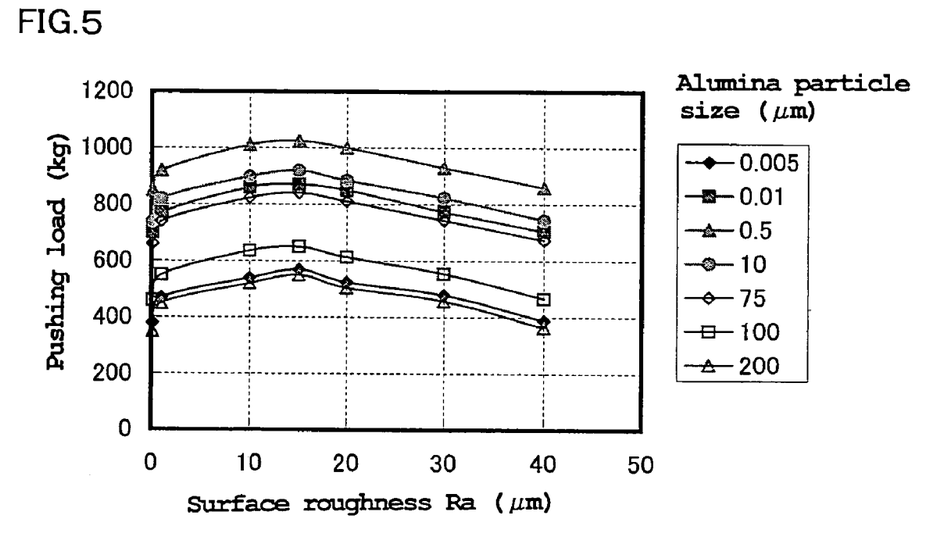
FIG. 5 is a graph showing a relation between surface roughness (Ra) of a honeycomb unit and a pushing load when an alumina particle size of a seal material is changed in a silicon carbide honeycomb structure.

Table 4 shows the pushing load when the alumina particle size in the seal material and the surface roughness of the honeycomb unit are changed in the honeycomb structure formed by adhering the silicon carbide honeycomb units with the alumina seal material, which are shown in FIGS. 4 and 5. As seen from these results, when the particle size is 0.01-100 μm, the high pushing load is obtained.

Figure 6:
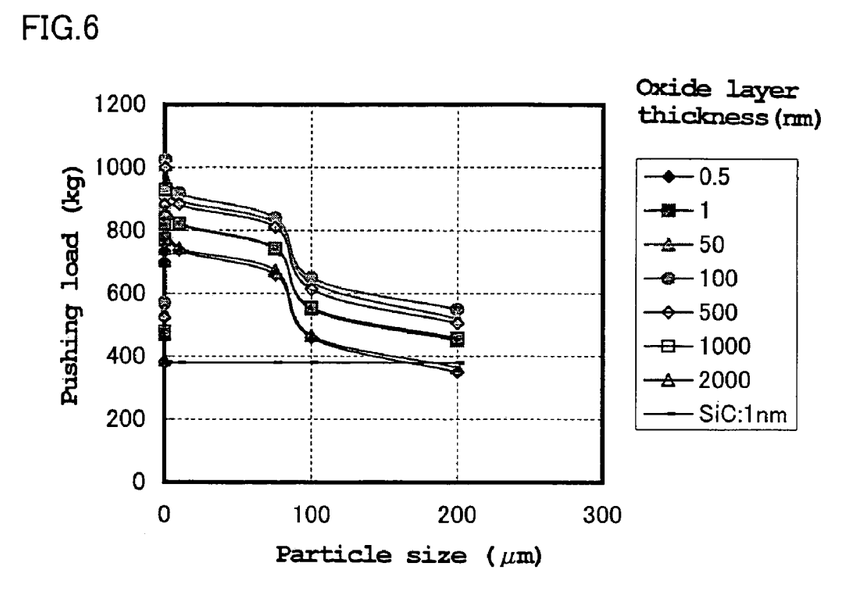
FIG. 6 is a graph showing a relation between an alumina particle size (Ra) of a seal material and a pushing load when an oxide layer thickness of a honeycomb unit is changed in a silicon carbide structure.
Figure 7:
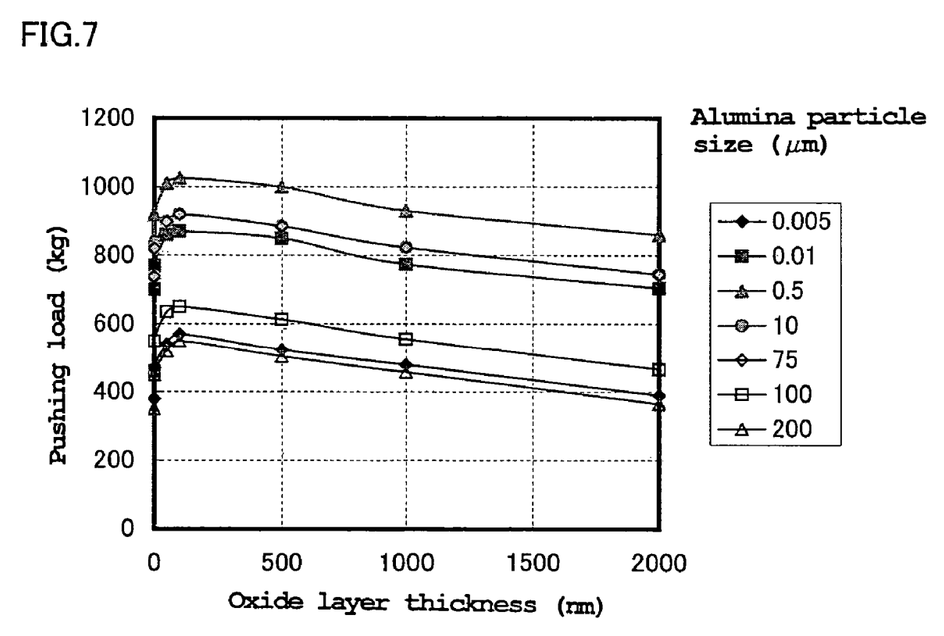
FIG. 7 is a graph showing a relation between an oxide layer thickness of a honeycomb unit and a pushing load when an alumina particle size of a seal material is changed in a silicon carbide structure.

Table 5 shows the pushing load when the alumina particle size in the seal material and the oxide film in the honeycomb unit are changed in the honeycomb structure formed by adhering the silicon carbide honeycomb units with the alumina seal material, which are shown in FIGS. 6 and 7. In case of using the seal material having an alumina particle size of 0.01-100 μm, the high pushing load is obtained.

Figure 8:
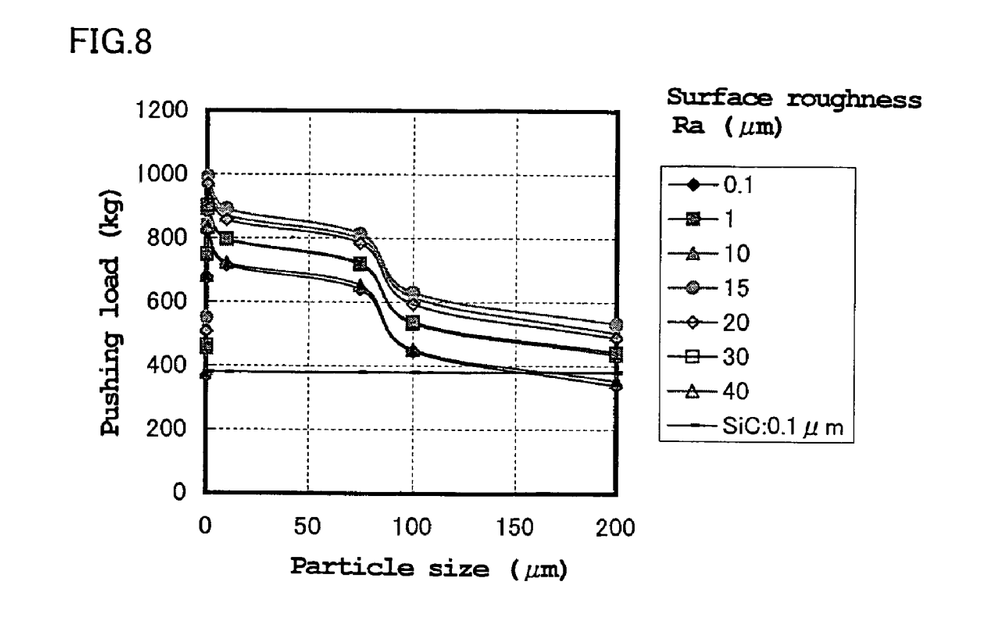
FIG. 8 is a graph showing a relation between a zirconia particle size of a seal material and a pushing load when a surface roughness (Ra) of a honeycomb unit is changed in a fiber-reinforced alumina honeycomb structure.
Figure 9:
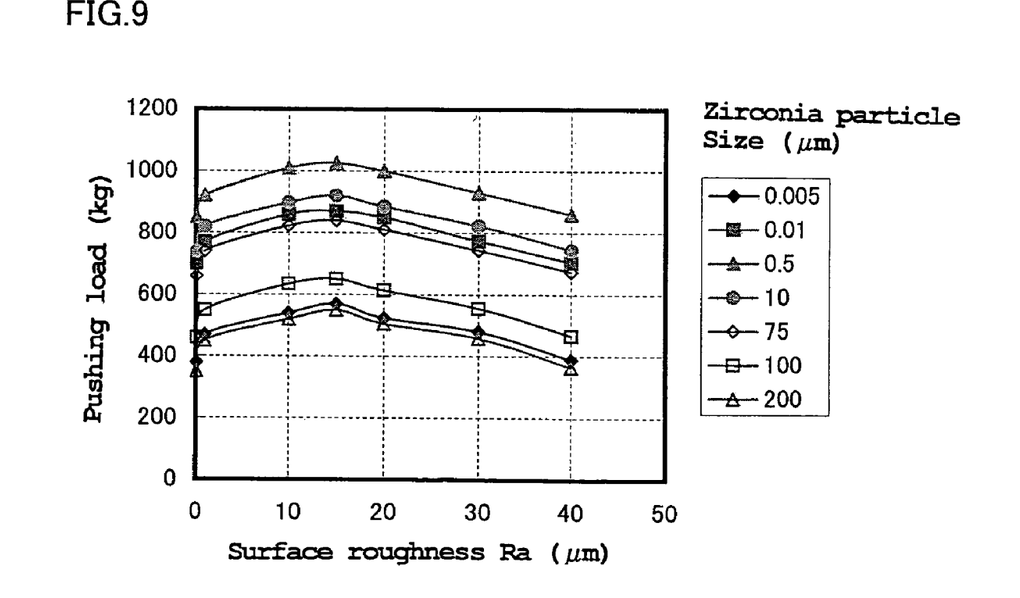
FIG. 9 is a graph showing a relation between a surface roughness (Ra) of a honeycomb unit and a pushing load when a zirconia particle size of a seal material is changed in a fiber-reinforced alumina honeycomb structure.

Table 6 shows the pushing load when the zirconia particle size in the seal material and the surface roughness of the honeycomb unit are changed in the honeycomb structure formed by adhering the fiber-reinforced alumina honeycomb units with the alumina seal material, which are shown in FIGS. 8 and 9. As seen from these results, in case of the seal material having a zirconia particle size of 0.01-100 μm, the high pushing load of from 640 to 994 kg is obtained.

TABLE 4

<Pushing load (kg)>

| Honeycomb unit Surface roughness Ra(μm) | Seal material: average particle size of alumina particle (μm) | | | | | | | |
|---|---|---|---|---|---|---|---|---|
| | Paste 8 0.005 | Paste 1 0.01 | Paste 2 0.1 | Paste 3 0.5 | Paste 4 10 | Paste 5 75 | Paste 6 100 | Paste 7 200 |
| 0.1 | 380 | 700 | 735 | 850 | 738 | 660 | 460 | 350 |
| 1 | 470 | 770 | 820 | 920 | 820 | 740 | 550 | 450 |
| 10 | 540 | 860 | 897 | 1010 | 898 | 823 | 635 | 520 |
| 15 | 570 | 870 | 919 | 1025 | 920 | 840 | 650 | 550 |
| 20 | 524 | 850 | 883 | 1000 | 885 | 810 | 613 | 505 |
| 30 | 480 | 774 | 821 | 930 | 823 | 744 | 555 | 458 |
| 40 | 390 | 705 | 743 | 860 | 745 | 674 | 467 | 365 |

| Honeycomb unit Surface roughness Ra(μm) | Seal material: average particle size of SiC particel (μm) | | | | | | | |
|---|---|---|---|---|---|---|---|---|
| | Paste 24 0.005 | Paste 17 0.01 | Paste 18 0.1 | Paste 19 0.5 | Paste 20 10 | Paste 21 75 | Paste 22 100 | Paste 23 200 |
| SiC: 0.1 μm | 380 | 380 | 380 | 382 | 380 | 380 | 380 | 380 |

TABLE 5

<Pushing load (kg)>

| Oxide layer thickness of honeycomb unit (nm) | Seal material: average particle size of alumina particle (μm) | | | | | | | | Heating time (minutes) |
|---|---|---|---|---|---|---|---|---|---|
| | Paste 8 0.005 | Paste 1 0.01 | Paste 2 0.1 | Paste 3 0.5 | Paste 4 10 | Paste 5 75 | Paste 6 100 | Paste 7 200 | |
| 0.5 | 380 | 700 | 735 | 850 | 738 | 660 | 460 | 350 | 1 |
| 1 | 470 | 770 | 820 | 920 | 820 | 740 | 550 | 450 | 10 |
| 50 | 540 | 860 | 897 | 1010 | 898 | 823 | 635 | 520 | 100 |
| 100 | 570 | 870 | 919 | 1025 | 920 | 840 | 650 | 550 | 150 |
| 500 | 524 | 850 | 883 | 1000 | 885 | 810 | 613 | 505 | 200 |
| 1000 | 480 | 774 | 821 | 930 | 823 | 744 | 555 | 458 | 300 |
| 2000 | 390 | 705 | 743 | 860 | 745 | 674 | 467 | 365 | 400 |

| Oxide layer thickness of honeycomb unit(nm) | Seal material: average particle size of SiC particle (μm) | | | | | | | | Heating time (minutes) |
|---|---|---|---|---|---|---|---|---|---|
| | Paste 24 0.005 | Paste 17 0.01 | Paste 18 0.1 | Paste 19 0.5 | Paste 20 10 | Paste 21 75 | Paste 22 100 | Paste 23 200 | |
| SiC: 1 nm | 380 | 380 | 380 | 382 | 380 | 380 | 380 | 380 | 1 |

TABLE 6

<Pushing load (kg)>

| Honeycomb unit Surface roughness Ra(μm) | Seal material: average particle size of zirconia particle (μm) | | | | | | | |
|---|---|---|---|---|---|---|---|---|
| | Paste 16 0.005 | Paste 9 0.01 | Paste 10 0.1 | Paste 11 0.5 | Paste 12 10 | Paste 13 75 | Paste 14 100 | Paste 15 200 |
| 0.1 | 368 | 679 | 714 | 824 | 715 | 640 | 446 | 339 |
| 1 | 455 | 746 | 796 | 892 | 795 | 717 | 533 | 436 |
| 10 | 523 | 834 | 872 | 980 | 871 | 798 | 615 | 504 |
| 15 | 552 | 843 | 890 | 994 | 892 | 814 | 630 | 533 |
| 20 | 508 | 824 | 855 | 970 | 858 | 785 | 594 | 489 |
| 30 | 465 | 751 | 797 | 902 | 798 | 721 | 538 | 444 |
| 40 | 378 | 683 | 722 | 834 | 722 | 653 | 452 | 354 |

| Honeycomb unit Surface roughness Ra(μm) | Seal material: average particle size of SiC particle (μm) | | | | | | | |
|---|---|---|---|---|---|---|---|---|
| | Paste 24 0.005 | Paste 17 0.01 | Paste 18 0.1 | Paste 19 0.5 | Paste 20 10 | Paste 21 75 | Paste 22 100 | Paste 23 200 |
| SiC: 0.1 μm | 380 | 380 | 380 | 382 | 380 | 380 | 380 | 380 |

In general, it is said that a load of about 1.0-2.0 kg/cm² (98.0-196.1 kPa) per unit area is applied to the honeycomb structure for the purification of the exhaust gas in the automobile by vibrations of the engine and pressure of the exhaust gas in case of the filter of 34.3 mm×34.3 mm×150 cm. When this load is applied to the test specimen (sample), the adhesion strength required for the seal material layer (load supporting area: 206 cm$_2$) joining one honeycomb unit (34.3 mm×34.3 mm×150 mm) in the honeycomb structure is about 412 kg at maximum. From this result, it is clear that the seal material layer shows the adhesiveness capable of sufficiently putting into practical use.

As seen from FIGS. 4 and 8, when the surface roughness Ra of the outer surface of the honeycomb unit or honeycomb monolith is 1-30 μm, the sealing property is good. Also, as shown in FIG. 6, the sealing property is more improved when the oxide film is existent.

As to the pastes 1-14 for the seal material, each sample is shaped into a disc having a thickness of 5 mm and a diameter of 5 cm, which is dried and heat-treated. Then, the density of the sample is measured and the thermal conductivity is measured by a laser flash method. The results are shown in Tables 7 and 8.

TABLE 7

| | Seal material: average particle size of alumina particle (μm) | | | | | | | |
|---|---|---|---|---|---|---|---|---|
| Density kg/m³ = 2000 | Paste 8 0.005 | Paste 1 0.01 | Paste 2 0.1 | Paste 3 0.5 | Paste 4 10 | Paste 5 75 | Paste 6 100 | Paste 7 200 |
| Thermal conductivity λ(W/mk) | 0.34 | 0.35 | 0.45 | 0.596 | 0.5 | 0.4 | 0.35 | 0.3 |

TABLE 8

| Density kg/m³ = 2200 | Seal Material: average particle size of zirconia particle (μm) | | | | | | | |
|---|---|---|---|---|---|---|---|---|
| | Paste 16 0.005 | Paste 9 0.01 | Paste 10 0.1 | Paste 11 0.5 | Paste 12 10 | Paste 13 75 | Paste 14 100 | Paste 15 200 |
| Thermal conductivity λ(W/mk) | 0.3 | 0.33 | 0.43 | 0.48 | 0.432 | 0.40 | 0.3 | 0.2 |

As seen from the results, when the alumina particle size or zirconia particle size of the seal material is 0.1 to about 75 μm, particularly 0.1 to 10 μm, the high thermal conductivity is obtained. This is guessed due to the fact that the filling property is improved to increase the contact places while gaps between particles are generated in case of coarse particles and second particles are produced in case of finer particles to generate gaps between the particles.

This application claims a benefit of priority based on PCT/JP2005/006532 filed on Mar. 28, 2005, the entire contents of which patent application is hereby incorporated by reference.

INDUSTRIAL APPLICABILITY

The invention is used as a filter in not only an apparatus for the purification and/or convertion of the exhaust gas in the internal combustion but also an apparatus for purifying and/or converting the exhaust gas discharged from a boiler, a heating furnace, a gas turbine or various industrial processes. Particularly, it is useful as a catalyst carrier for the convertion of the exhaust gas in the automobiles or a diesel-particulate-filter (DPF) having a function of filtering and combustion-purifying particulate matter (PM) in the exhaust gas. Of course, it can be utilized in applications without supporting the catalyst component (e.g. adsorbent or the like adsorbing gas components or liquid components) and the like.

What is claimed is:

1. A honeycomb structure comprising:
an assembly including a plurality of honeycomb units;
each of the plurality of honeycomb units comprising silicon carbide-based ceramic and having a plurality of through-holes and two end faces, each at one of the two opposite ends of the honeycomb unit, wherein the through-holes extend from one end face to the opposing end face; and
a layer of a seal material interposed between and in direct contact with abutting honeycomb units to adhere the plurality of honeycomb units together, wherein the seal material comprises an inorganic binder and oxide particles having a particle size of about 0.01 to about 100 μm.

2. A honeycomb structure according to claim 1, wherein a layer of seal material envelops a peripheral portion of the assembly between the opposing end faces of the honeycomb units.

3. A honeycomb structure according to claim 1, wherein the oxide particles in the seal material layer comprise one or more kinds of particles selected from alumina, zirconia, titania, and silica.

4. A honeycomb structure according to claim 1, wherein the oxide particles have a particle size of about 0.1 to about 75 μm.

5. A honeycomb structure according to claim 1, wherein the honeycomb unit comprises a ceramic having an oxide layer on its surface.

6. A honeycomb structure according to claim 5, wherein the oxide layer has a thickness of about 1 nm to about 1 μm.

7. A honeycomb structure according to any one of claims 1 to 6, wherein a surface of the honeycomb unit in contact with the seal material layer has a roughness Ra of about 1.0 to about 30 μm.

8. A honeycomb structure according to any one of claims 1 to 6, wherein one of two end openings of the through-hole in the honeycomb unit is sealed with a plugging material.

9. A honeycomb structure according to any one of claims 1 to 6, wherein the honeycomb unit has a catalyst supported on a wall surface of the through-hole.

10. A honeycomb structure according to any one of claims 1 to 6, said honeycomb structure is used as an apparatus for the purification of an exhaust gas in an automobile.

* * * * *